(12) United States Patent
Niinuma et al.

(10) Patent No.: US 11,244,206 B2
(45) Date of Patent: Feb. 8, 2022

(54) IMAGE NORMALIZATION FOR FACIAL ANALYSIS

(71) Applicants: FUJITSU LIMITED, Kawasaki (JP); CARNEGIE MELLON UNIVERSITY, Pittsburgh, PA (US)

(72) Inventors: Koichiro Niinuma, Pittsburg, PA (US); Laszlo A. Jeni, Pittsburg, PA (US); Itir Onal Ertugrul, Pittsburgh, PA (US); Jeffrey F. Cohn, Pittsburgh, PA (US)

(73) Assignees: FUJITSU LIMITED, Kawasaki (JP); CARNEGIE MELLON UNIVERSITY, Pittsburgh, PA (US)

( * ) Notice: Subject to any disclaimer, the term of this patent is extended or adjusted under 35 U.S.C. 154(b) by 177 days.

(21) Appl. No.: 16/563,559

(22) Filed: Sep. 6, 2019

(65) Prior Publication Data
US 2021/0073600 A1  Mar. 11, 2021

(51) Int. Cl.
*G06K 9/62* (2006.01)
*G06K 9/00* (2006.01)

(52) U.S. Cl.
CPC ....... *G06K 9/6298* (2013.01); *G06K 9/00268* (2013.01); *G06K 9/00335* (2013.01); *G06K 9/6256* (2013.01)

(58) Field of Classification Search
CPC ........... G06K 9/00268; G06K 9/00335; G06K 9/6256
See application file for complete search history.

(56) References Cited

U.S. PATENT DOCUMENTS

| 8,798,374 | B2 | 8/2014 | Bartlett et al. | |
|---|---|---|---|---|
| 2013/0142426 | A1* | 6/2013 | Kaneda | G06K 9/4642 382/165 |
| 2014/0023269 | A1 | 1/2014 | Sudha et al. | |
| 2015/0324632 | A1* | 11/2015 | Whitehill | G06K 9/6292 382/159 |
| 2017/0185827 | A1* | 6/2017 | Yamaya | G10L 25/78 |

(Continued)

OTHER PUBLICATIONS

M. Amirian, M. Kächele, G. Palm, and F. Schwenker. "Support vector regression of sparse dictionary-based features for view-independent action unit intensity estimation". In Automatic Face & Gesture Recognition (FG 2017), 12th IEEE International Conference on, pp. 854-859, May 30-Jun. 3, 2017.

(Continued)

*Primary Examiner* — Myron Wyche
(74) *Attorney, Agent, or Firm* — Maschoff Brennan

(57) ABSTRACT

A method may include obtaining a base facial image, and obtaining a first set of base facial features within the base facial image, the first set of base facial features associated with a first facial AU to be detected in an analysis facial image. The method may also include obtaining a second set of base facial features within the base facial image, the second set of facial features associated with a second facial AU to be detected. The method may include obtaining the analysis facial image, and applying a first image normalization to the analysis facial image using the first set of base facial features to facilitate prediction of a probability of the first facial AU. The method may include applying a second image normalization to the analysis facial image using the second set of base facial features to facilitate prediction of a probability of the second facial AU.

20 Claims, 7 Drawing Sheets

(56) References Cited

U.S. PATENT DOCUMENTS

2019/0357797 A1* 11/2019 Nestor ............... G06K 9/00315
2020/0074240 A1* 3/2020 Desai .................... G06N 3/084

OTHER PUBLICATIONS

T. Baltrušaitis, M. Mahmoud, and P. Robinson. "Cross-dataset learning and person-specific normalisation for automatic action unit detection" In Automatic Face & Gesture Recognition and Workshops (FG 2015), 2015 IEEE International Conference on, May 4-8, 2015.
J. C. Batista, V. Albiero, O. R. P. Bellon, and L. Silva. AUMPNet: simultaneous action units detection and intensity estimation on multipose facial images using a single convolutional neural network. In Automatic Face & Gesture Recognition (FG 2017), 2017 12th IEEE International Conference on, pp. 868-871, 2017.
W.-S. Chu, F. De la Torre, and J. F. Cohn. "Learning facial action units with spatiotemporal cues and multi-label sampling" Image and vision computing, 81:1-14, Jan. 1, 2019.
J. F. Cohn and F. De la Torre. "Automated face analysis for affective" In The Oxford handbook of affective computing, p. 131. 2014.
J. F. Cohn, I. O. Ertugrul, W.-S. Chu, J. M. Girard, L. A. Jeni, and Z. Hammal. "Chapter 19—affective facial computing: Generalizability across domains" In Multimodal Behavior Analysis in the Wild, Computer Vision and Pattern Recognition, pp. 407-441. Academic Press, Jan. 2019.
C. A. Comeanu, M. O. Simón, J. F. Cohn, and S. E. Guerrero. "Survey on RGB, 3D, thermal, and multimodal approaches for facial expression recognition: History, trends, and affect-related applications" IEEE Transactions on Pattern Analysis and Machine Intelligence, 38(8):1548-1568, Jan. 7, 2016.
I. O. Ertugrul, L. A. Jeni, and J. F. Cohn. "FACSCaps: Pose-independent facial action coding with capsules". IEEE Conference on Computer Vision and Pattern Recognition (CVPR) Workshops, Dec. 7, 2018.
S. Ghosh, E. Laksana, S. Scherer, and L.-P. Morency. "A multi-label convolutional neural network approach to cross-domain action unit detection" International Conference on Affective Computing and Intelligent Interaction (ACII), Sep. 2015.
J. C. Gower. "Generalized procrustes analysis" Psychometrika, 40(1):33-51, 1975.
A. Gudi, H. E. Tasli, T. M. Den Uyl, and A. Maroulis. "Deep learning based FACS action unit occurrence and intensity estimation" In 2015 11th IEEE International Conference and Workshops on Automatic Face and Gesture Recognition (FG), vol. 6, pp. 1-5, 2015.
J. He, D. Li, B. Yang, S. Cao, B. Sun, and L. Yu. "Multi view facial action unit detection based on CNN and BLSTM-RNN" In Automatic Face & Gesture Recognition (FG 2017), 2017 12th IEEE International Conference on, pp. 848-853, 2017.
L. A. Jeni, A. Lorincz, T. Nagy, Zs. Palotai, J. Sebok, Z. Szabo, and D. Takacs. "3D shape estimation in video sequences provides high precision evaluation of facial expressions" Image and Vision Computing, 30(10):785-795, 2012.
D. E. King. Dlib-ml: A machine learning toolkit. Journal of Machine Learning Research, 10:1755-1758, 2009.
S. Kumano, K. Otsuka, J. Yamato, E. Maeda, and Y. Sato. Pose-invariant facial expression recognition using variable-intensity templates. International Journal of Computer Vision, 83(2):178-194, 2009.
W. Li, F. Abtahi, Z. Zhu, and L. Yin. EAC-Net: Deep nets with enhancing and cropping for facial action unit detection. IEEE Transactions on Pattern Analysis and Machine Intelligence, 40(11):2583-2596, 2018.
X. Li, S. Chen, and Q. Jin. Facial action units detection with multi-features and—AUs fusion. In Automatic Face & Gesture Recognition (FG 2017), 2017 12th IEEE International Conference on, pp. 860-865, 2017.
B. Martinez, M. F. Valster, B. Jiang, and M. Pantic. Automatic analysis of facial actions: A survey. IEEE Transactions on Affective Computing, 2017.
S. M. Mavadati, M. H. Mahoor, K. Bartlett, P. Trinh, and J. F. Cohn. DISFA: A spontaneous facial action intensity database. IEEE Transactions on Affective Computing, 4 (2):151-160, 2013.
O. M. Parkhi, A. Vedaldi, and A. Zisserman. Deep face recognition. British Machine Vision Conference, 2015.
O. Rudovic, M. Pantic, and I. Patras. Coupled gaussian processes for pose-invariant facial expression recognition. IEEE transactions on pattern analysis and machine intelligence, 35(6):1357-1369, Jun. 2013.
K. Simonyan and A. Zisserman. Very deep convolutional networks for large-scale image recognition. In International Conference on Learning Representations (ICLR), 2015.
S. Taheri, P. Turaga, and R. Chellappa. Towards view-invariant expression analysis using analytic shape manifolds. In Face and Gesture 2011, pp. 306-313, 2011.
C. Tang, W. Zheng, J. Yan, Q. Li, Y. Li, T. Zhang, and Z. Cui. View-independent facial action unit detection. In Automatic Face & Gesture Recognition (FG 2017), 2017 12th IEEE International Conference on, pp. 878-882, 2017.
Z. T"osér, L. A. Jeni, A L"orincz, and J. F. Cohn. Deep learning for facial action unit detection under large head poses. In Computer Vision—ECCV 2016 Workshops, pp. 359-371, 2016.
M. F. Valstar, T. Almaev, J. M. Girard, G. McKeown, M. Mehu, L. Yin, M. Pantic, and J. F. Cohn. FERA 2015-second facial expression recognition and analysis challenge. In 2015 11th IEEE International Conference and Workshops on Automatic Face and Gesture Recognition (FG), vol. 6, pp. 1-8, 2015.
M. F. Valstar, E. Sánchez-Lozano, J. F. Cohn, L. A. Jeni, J. M. Girard, Z. Zhang, L. Yin, and M. Pantic. FERA 2017—addressing head pose in the third facial expression recognition and analysis challenge. In Automatic Face & Gesture Recognition (FG 2017), 2017 12th IEEE International Conference on, pp. 839-847, 2017.
X. Zhang, L. Yin, J. F. Cohn, S Canavan, M. Reale, A. Horowitz, and J. M. Girard. BP4D-spontaneous: a high-resolution spontaneous 3D dynamic facial expression database. Image and Vision Computing, 32(10):692-706, 2014.
Z. Zhang, J. M. Girard, Y. Wu, X. Zhang, P. Liu, U. Ciftci, S. Canavan, M. Reale A. Horowitz, H. Yang, J. Cohn, Q. Ji, and L. Yin. Multimodal spontaneous emotion corpus for human behavior analysis. In Proceedings of the IEEE Conference on Computer Vision and Pattern Recognition (CVPR), pp. 3438-3446, 2016.
Y. Zhou, J. Pi, and B. E. Shi. Pose-independent facial action unit intensity regression based on multi-task deep transfer learning. In Automatic Face & Gesture Recognition (FG 2017), 2017 12th IEEE International Conference on, pp. 872-877, 2017.
Itir Onal Ertugrul, Laszlo A. Jeni, Jeffrey F. Cohn "FACSCaps: Pose-Independent Facial Action Coding With Capsules" The IEEE Conference on Computer Vision and Pattern Recognition (CVPR) Workshops, (Jun. 2018) pp. 2130-2139.
https://emotionresearchlab.com/ retrieved Sep. 5, 2019.
https://www.affectiva.com/what/products/ retrieved Sep. 5, 2019.
Dlib Facial Landmarks Detection API http://dlib.net/imaging.html, May 25, 2018.
Laszlo A. Jeni et al. "Dense 3D Face Alignment from 2D Videos in Real-Time" Accepted for the 11th IEEE International Conference on Automatic Face and Gesture Recognition, Ljubljana, Slovenia, May 2015.

* cited by examiner

IMAGE NORMALIZATION FOR FACIAL ANALYSIS

FIELD

Embodiments of the present disclosure relate to image normalization for facial analysis.

BACKGROUND

Facial analysis has been used to identify individuals or to identify expressions on faces. However, different images of faces have different orientations or poses, making it difficult to provide consistent analysis of such images.

SUMMARY

One or more embodiments of the present disclosure may include a method that includes obtaining a base facial image, and obtaining a first set of base facial features within the base facial image, where the first set of base facial features may be selected as being associated with a first facial action unit (AU) to be detected in an analysis facial image. The method may also include obtaining a second set of base facial features within the base facial image, where at least one facial feature in the second set of base facial features is different from those in the first set of base facial features. The second set of facial features may be selected as being associated with a second facial AU to be detected in the analysis facial image. The method may also include obtaining the analysis facial image, and applying a first image normalization to the analysis facial image using the first set of base facial features to facilitate prediction of a probability of the first facial AU in the analysis facial image. The method may additionally include applying a second image normalization to the analysis facial image using the second set of base facial features to facilitate prediction of a probability of the second facial AU in the analysis facial image.

The object and advantages of the embodiments will be realized and achieved at least by the elements, features, and combinations particularly pointed out in the claims.

It is to be understood that both the foregoing general description and the following detailed description are merely examples and explanatory and are not restrictive.

BRIEF DESCRIPTION OF THE DRAWINGS

Example embodiments will be described and explained with additional specificity and detail through the use of the accompanying drawings in which.

DETAILED DESCRIPTION

The present disclosure relates to analyzing facial images to predict whether or not an AU is in an analysis image being analyzed, and may predict the intensity of the AU if it is present. To provide consistent analysis between analysis images, the analysis images may be normalized. For example, a base set of features in a base image may be selected and the corresponding features may be identified in the analysis image to be analyzed. Using the locations of the identified features, the analysis image may be scaled, transposed, rotated, etc. so that the analysis image is aligned with the base image. In some embodiments, the image normalization may differ based on which AU is being detected in the analysis image. For example, different features may be selected in the base image that are specific to an AU or a set of AUs. The analysis image may then be analyzed using a predictive model, engine or other tool to detect or predict the probability of the presence and/or intensity of the AUs within the analysis image.

In some circumstances, embodiments of the present disclosure may facilitate improvement in the performance of a computer by applying the teachings of the present disclosure. For example, by providing specialized image normalization, computer-based AU identification in a computer may be improved such that a more accurate and consistent analysis may be performed. Because the system is more accurate, less iterations of detection may have to be performed, resulting in a savings in computing processing resources and time. Additionally, the increased accuracy is an improvement itself.

One or more example embodiments are explained with reference to the accompanying drawings.

Figure 1:
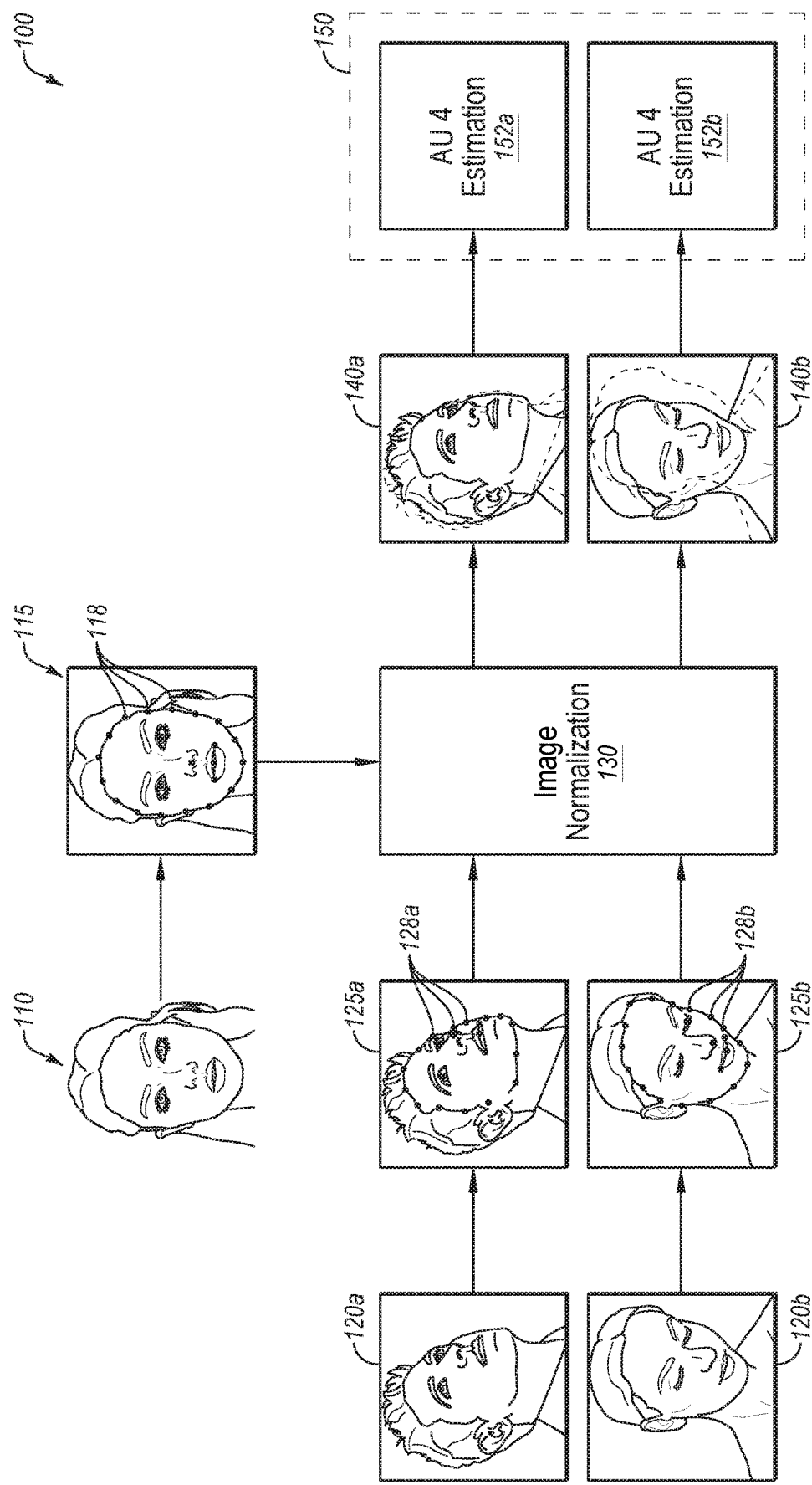
FIG. 1 is a diagram illustrating an example flow of image normalization and facial analysis.

FIG. 1 is a diagram illustrating an example flow 100 of image normalization and facial analysis, in accordance with one or more embodiments of the present disclosure. The flow 100 illustrates the process by which a base image 110 is used to facilitate prediction of one or more AUs in analysis images 120 (such as the analysis images 120*a* and 120*b*). A computing system may perform the tasks to carry out the flow 100, such as a computing system described with reference to FIG. 6.

As illustrated in FIG. 1, a base image 110 may be obtained. The base image may be used to derive features that may be reproducibly identified in other images to facilitate normalization of such other images. For example, the base image 110 may be used to derive a base set of features 115. The features 115 may include any locations 118 on the face, such as the center of the eyes, the tip of the nose, the corners and center of the mouth, and the outline of the face. The features 115 may be used across images to facilitate consistent normalization of the images. The base image 110 may include an image of a face that is forward facing with a neutral expression. As used herein, a neutral expression may be characterized as one in which more than half of the AUs of the facial image have an intensity of A or less. In some embodiments, a neutral expression may be specifically identified as one in which all, or nearly all (e.g., all but one, all but two, all but three, etc.) of the AUs of the facial image have an intensity of A or less. In some embodiments, the base image 110 may be rescaled to a size expected by an entity, engine, model, etc. performing image analysis 150.

In some embodiments, the base set of features 115 may be obtained using a third party tool or application programming interface (API) that may facilitate the detection and/or identification of the location of various facial landmarks to be used as the base set of features 115.

After obtaining the base set of features 115, one or more analysis images 120 may be obtained, and the features 125 corresponding to the base set of features 115 may be identified at their locations 128 in the analysis images 120.

As shown in FIG. 1, the features 125 are at the locations 128a in the analysis image 120a and at the locations 128b in the analysis image 120b. As can be seen, because the images are from different perspectives, the features 125a and 125b have differing corresponding locations 128a and 128b, respectively.

Figure 5:
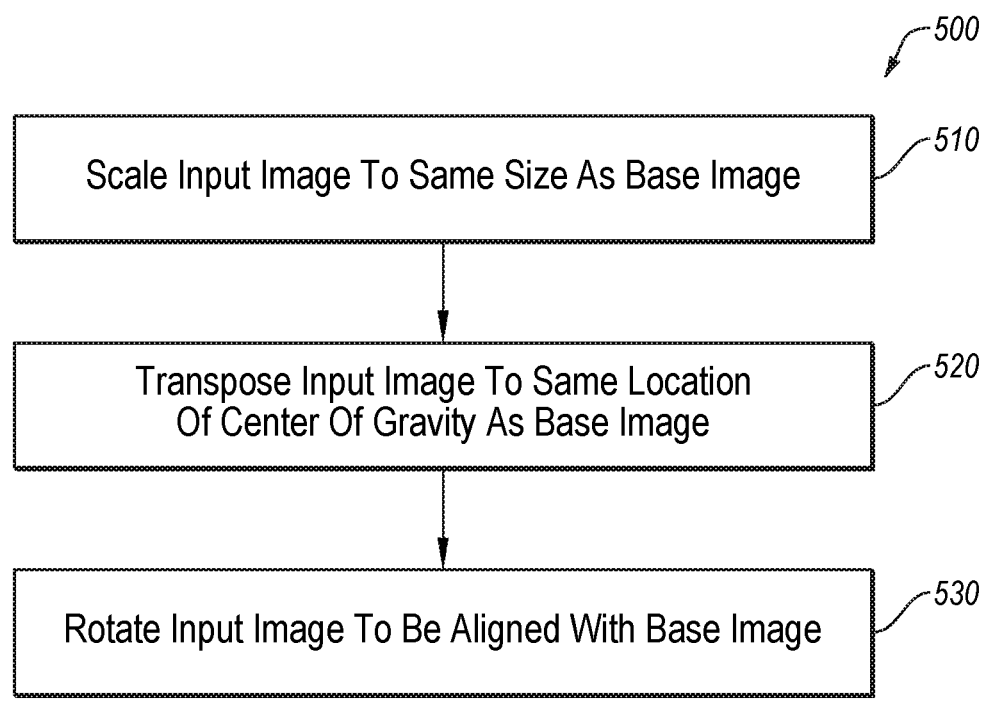
FIG. 5 illustrates an example flowchart of an example method of one technique of image normalization.

Based on the locations 128a and/or 128b, image normalization is performed on the analysis images 120. For example, the analysis images 120 may be rotated, resized, moved, etc. to be in a normalized position to permit consistent analysis across varied analysis images 120. In some embodiments, such image normalization may include a Procrustes analysis transformation relative to the base image 110 and/or the corresponding base set of features 115. One example of the image rotation, resizing, etc. is illustrated in FIG. 5. The image normalization 130 may yield normalized images 140 (such as the normalized images 140a and 140b). While a Procrustes analysis transformation is used as an example normalization technique, any of a variety of normalization techniques may be used.

After the analysis images 120 have been normalized into the normalized images 140, the image analysis 150 may be performed on the normalized images 140. For example, a prediction of the likelihood of the presence of one or more AUs may be performed on the normalized images 140 at the image analysis 150. In these and other embodiments, an estimation of the probability of AU 4 may be performed at 152a on the normalized image 140a and at 152b on the normalized image 152b. In these and other embodiments, the prediction may include a binary absence or presence of the AU. Additionally or alternatively, an intensity of the AU may be part of the prediction, such as a rank between A-E where A—trace, B—slight, C—marked/pronounced, D—severe or extreme, and E—maximum for the individual person (e.g., when predicting/detecting AU 1, the result may be AU 1B, meaning a slight presence of AU 1). In addition to the prediction/detection of AUs, the image analysis 150 may include any other analysis, such as facial detection, facial identification/recognition, etc. The image analysis 150 may include any type of image analysis that predicts the probability of an AU within the analysis image 120. For example, the image analysis 150 may include a machine learning model, engine, component, system, etc. that is trained using a dataset to identify the various AUs. As another example, the image analysis 150 may include an API of a third party analysis tool.

The result of the image analysis 150 may be output to a display or otherwise used in a computing device. In some embodiments, the outputs may include an analysis of multiple AUs, including AUs 0-28 as identified in Table 1 herein.

When performing facial analysis on the analysis image 120, the analysis images 120 are not always in the same orientation as the base image 110. For example, the analysis image 120 may include the face looking up and away, or turned slightly away from the camera capturing the analysis image 120, etc. Additionally or alternatively, certain distortions may be caused by the imaging apparatus or settings used when capturing the analysis image 120. By using the features 115, the analysis image 120 may be normalized to a similar size and/or orientation as the base image 110 to facilitate consistent facial analysis in the image analysis 150.

In some embodiments, the base set of features 115 may be identified within the base image 110 manually. For example, a human operator may physically select certain locations in the base image 110 as the features for the base set of features 115.

In some embodiments, the base image 110 and/or the base set of features 115 may be automatically obtained from a training dataset of images. For example, the location of facial features may be averaged across the images in the training dataset. Based on the average location, the base image 110 may be selected as the image with facial features most closely aligned with the average locations and/or an image within a threshold value (e.g., distance, percentage, etc.) of the average locations. Using the now-identified base image 110, the base set of features 110 may be identified within the base image 110. For example, if the base set of features 110 includes a landmark at the center of each of the eyes, at the tip of the nose, at the corners of the mouth and at the center of the mouth, and around the periphery of the face, those features may be obtained based on the base image 110.

In some embodiments, when automatically identifying the base set of features 115, a training dataset may be used. The facial features used as features may be averaged across the training dataset, and the location of the features may be based on the averaged locations, rather than based on any particular facial image. For example, if one of the features was at the center of the eyes, the average location of the center of the eyes across the training dataset may be used as the location for the landmark, even if not corresponding to any particular image in the training dataset.

In some embodiments, the selection of which features to use may be based on which action unit (AU) is being analyzed in the facial image. For example, a different set of features may be used for different AUs being detected within the analysis image 120. For example, if the probability of AU 1 were being predicted in the analysis image 120, the features may be placed more heavily around the eyes and frontalis muscle near the forehead (e.g., the features may be more dense around the region of the face that is expected to move in performing AU 1). Doing so may provide greater emphasis and ability to discern change near where the facial action is expected to occur. Additionally, by placing more features near or at the portions of the face that are expected to move, the distortion near those features may be reduced as compared to other regions of the face. In some embodiments, the features may be maintained across AUs, and different weights may be applied to the different features based on the AU being analyzed. For example, if the probability of AU 1 were being predicted in the analysis image 120, the features around the eyes and frontalis muscle near the forehead may be weighted more heavily than other features, such as those near the chin. In some embodiments, the identification of weights to be given to certain features may be based on an occlusion sensitivity map which may map histogram values of change in facial features when an AU is performed, where the weights may be higher for higher histogram values. Table 1 (below) provides examples of some AUs, with corresponding Facial Action Coding System (FACS) names, and the muscular groups that cause the facial action.

TABLE 1

| AU number | FACS name | Muscular basis |
|---|---|---|
| 0 | Neutral face | |
| 1 | Inner brow raiser | frontalis (pars medialis) |
| 2 | Outer brow raiser | frontalis (pars lateralis) |

TABLE 1-continued

| AU number | FACS name | Muscular basis |
|---|---|---|
| 4 | Brow lowerer | depressor glabellae, depressor supercilii, corrugator supercilii |
| 5 | Upper lid raiser | levator palpebrae superioris, superior tarsal muscle |
| 6 | Cheek raiser | orbicularis oculi (pars orbitalis) |
| 7 | Lid tightener | orbicularis oculi (pars palpebralis) |
| 8 | Lips toward each other | orbicularis oris |
| 9 | Nose wrinkler | levator labii superioris alaeque nasi |
| 10 | Upper lip raiser | levator labii superioris, caput infraorbitalis |
| 11 | Nasolabial deepener | zygomaticus minor |
| 12 | Lip corner puller | zygomaticus major |
| 13 | Sharp lip puller | levator anguli oris (also known as caninus) |
| 14 | Dimpler | buccinator |
| 15 | Lip corner depressor | depressor anguli oris (also known as triangularis) |
| 16 | Lower lip depressor | depressor labii inferioris |
| 17 | Chin raiser | mentalis |
| 18 | Lip pucker | incisivii labii superioris and incisivii labii inferioris |
| 19 | Tongue show | |
| 20 | Lip stretcher | risorius w/platysma |
| 21 | Neck tightener | platysma |
| 22 | Lip funneler | orbicularis oris |
| 23 | Lip tightener | orbicularis oris |
| 24 | Lip pressor | orbicularis oris |
| 25 | Lips part | depressor labii inferioris, or relaxation of mentalis or orbicularis oris |
| 26 | Jaw drop | masseter; relaxed temporalis and internal pterygoid |
| 27 | Mouth stretch | pterygoids, digastric |
| 28 | Lip suck | orbicularis oris |

Modifications, additions, or omissions may be made to the flow 100 without departing from the scope of the disclosure. For example, the designations of different elements in the manner described is meant to help explain concepts described herein and is not limiting. Further, the flow 100 may include any number of other elements or may be implemented within other systems or contexts than those described. For example, any number of analysis images 120 may be analyzed. As another example, the base image 110 may be replaced with a testing dataset of images that yield the base set of features 115 that are not based on any image.

Figure 2:
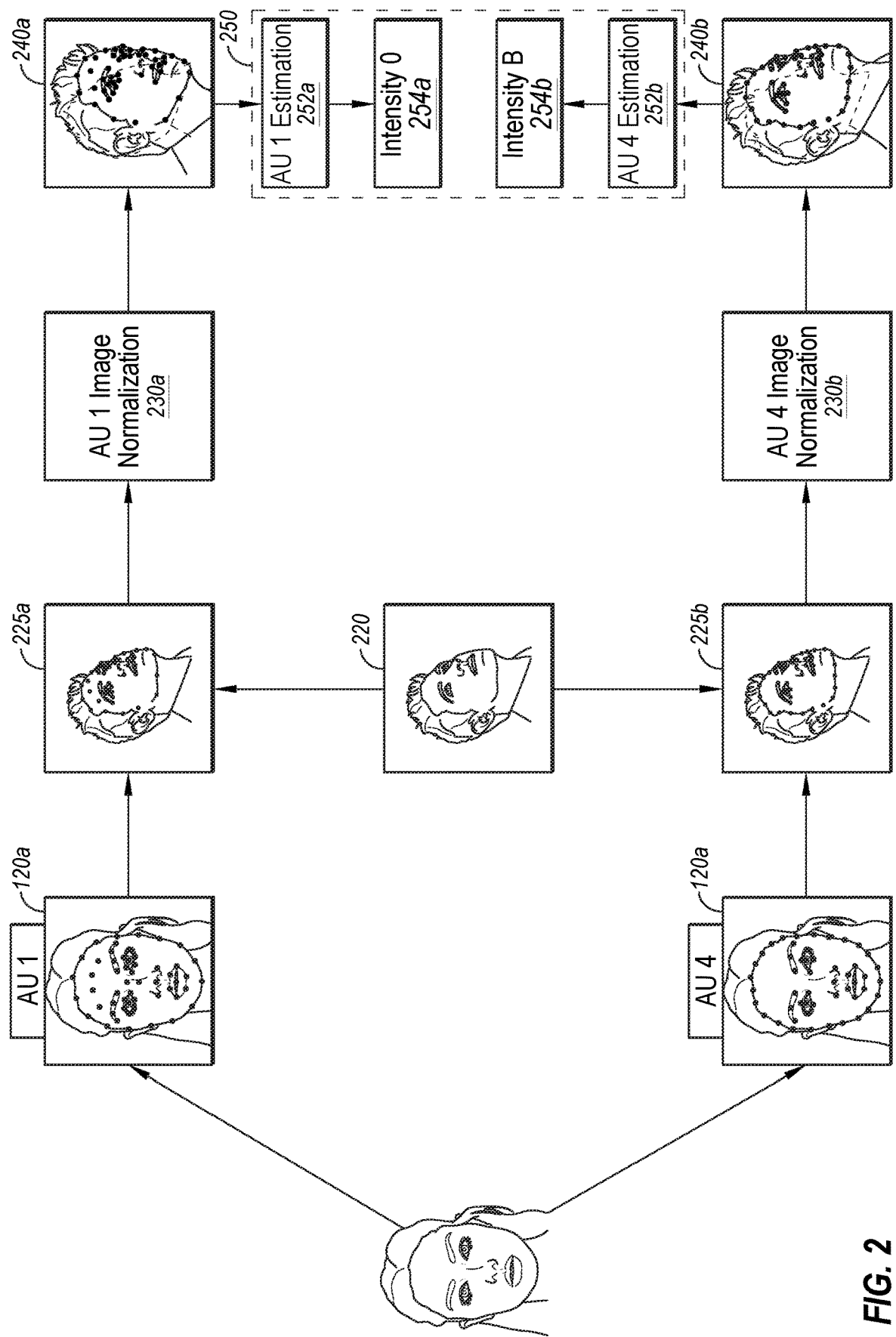
FIG. 2 is another diagram illustrating another example flow of image normalization and facial analysis.

FIG. 2 is another diagram illustrating another example flow 200 of image normalization and facial analysis, in accordance with one or more embodiments of the present disclosure. FIG. 1 illustrates a flow in which a single set of base features may be used to perform image analysis across multiple images. FIG. 2 illustrates a flow 200 in which multiple base sets of features 215 may be used to perform image analysis 250, where the base sets of features 215 may be specific to the AU (or to a set of AUs) being predicted.

As illustrated by the flow 200, a base image 210 may be obtained. The base image 210 may be similar or comparable to the base image 110 of FIG. 1. For example, the base image 210 may be forward-facing with a neutral expression on the face in the base image 210. At least two distinct sets of base features 215 may be identified within the base image 210. For example, the base set of features 215a at locations 218a may be associated with AU 1 and as such, may have additional features 215a near the eyes of the face to better measure the raising of the brows. The sets of base features 215 may be obtained in a similar manner as that described above with reference to FIG. 1. For example, the locations 218a may be averaged across a training dataset of images and the locations 218b may be averaged across the training dataset and the base image 210 may be selected as the image that has the facial features most closely aligned to the average locations across both the locations 218a and 218b. In some embodiments, a subset of the locations 218a and/or 218b (and/or other sets of features 215) may be used in automatically identifying the base image 210. As another example of automatically identifying the locations 218a of the features 215a, the average locations of the features 218a may be averaged across the images of the training dataset without identifying a particular image as the base image 210. Such identification may be repeated for each of the sets of features 215, each individually averaged and independently selected.

As illustrated in the flow 200, after obtaining the base sets of features 215a and 215b (and/or other sets of base features 215), an analysis image 220 may be obtained. The set of features 225a may be identified in the analysis image 220 at the locations 228a. Similarly, the set of features 225b may be identified in the analysis image 220 at the locations 228b.

Based on the features 225a, the analysis image 220 may be normalized in a manner specific to the AU being detected (e.g., AU 1) at the image normalization 230a, yielding a normalized image 240a. For example, the analysis image may undergo a Procrustes analysis transformation using the features 225a at the locations 228a and the features 215a. Similarly, the analysis image 220 may be normalized in a manner specific to the AU being detected (e.g., AU 4) at the image normalization 230b, yielding a normalized image 240b.

After being normalized, image analysis 250 may be performed on the normalized image 240a. For example, the image analysis 250 may perform an AU 1 estimation 252a of the probability that AU 1 is present in the analysis image 220. Additionally or alternatively, the image analysis 250 may yield an intensity 254 of the AU, such as intensity—0 (labeled as 254a) of the AU 1. Similarly, the image analysis 250 may perform an AU 4 estimation 252b of the probability that AU 4 is present in the analysis image 220, and/or may provide the intensity—B (labeled as 254b) of the AU 4.

While flow 200 has been illustrated for two distinct AUs, it will be appreciated that there may be any number of discrete sets of base features 215 for each AU being analyzed. Additionally or alternatively, groupings of AUs may use the same sets of base features 215 (e.g., AUs related to movement of the mouth may use one set of base features and movement of the eyes and brows may use a separate and distinct set of base features).

Modifications, additions, or omissions may be made to the flow 200 without departing from the scope of the disclosure. For example, the designations of different elements in the manner described is meant to help explain concepts described herein and is not limiting. Further, the flow 200 may include any number of other elements or may be implemented within other systems or contexts than those described. For example, any number of analysis images 220 may be analyzed. As another example, the presence of any number of AUs may be predicted.

Figure 3:
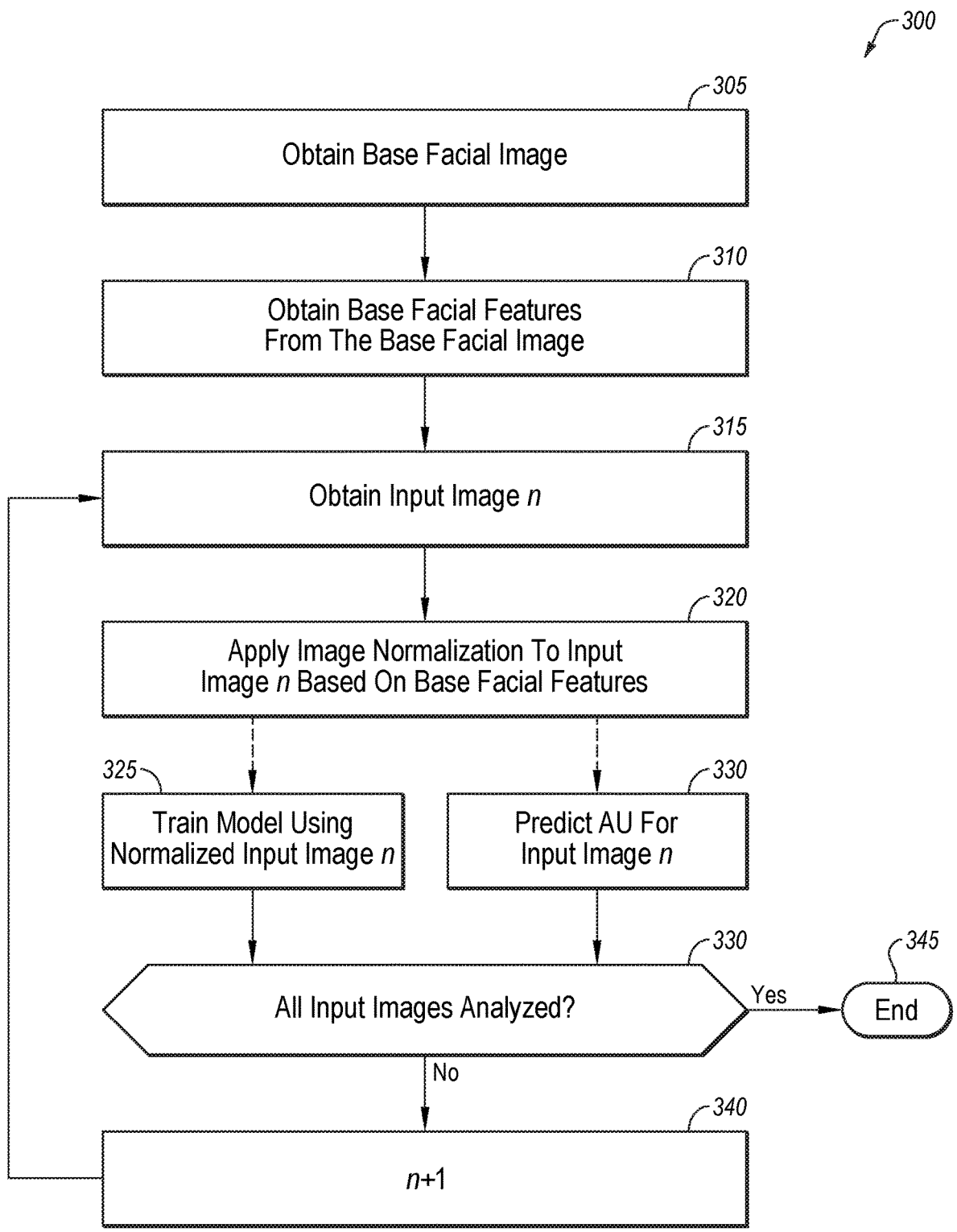
FIG. 3 illustrates an example flowchart of an example method of image normalization for facial images.

FIG. 3 illustrates an example flowchart of an example method of image normalization for facial images, in accordance with one or more embodiments of the present disclosure. One or more operations of the method 300 may be performed by a system or device, or combinations thereof, such as the computing device 600 of FIG. 6. The method 300 may be one example implementation of one or more of the flows of the present disclosure, such as the flow 100 and/or 200. Although illustrated as discrete blocks, various blocks of the method 300 may be divided into additional blocks, combined into fewer blocks, or eliminated, depending on the desired implementation.

At block 305, a base facial image may be obtained. For example, a base facial image may be provided or selected by a user or administrator. As another example, locations of facial features may be averaged across images of a training dataset and the image with facial features closest to the average locations may be used as the base facial image. The base facial image may be identified and/or obtained in any manner consistent with the present disclosure.

At block 310, a set of base facial features may be obtained from the base facial image obtained at the block 305. For example, key facial features such as eyes, brows, nose, jaw line, lips, tongue, etc. may serve as the features in the set of base facial features. In some embodiments, the set of base facial features may be automatically identified (for example, as described with respect to block 305). Additionally or alternatively, a user may select the set of features and/or the base image. In some embodiments, the set of base facial features may be selected based on muscle groups that are used in performing various AUs to be detected in facial images. For example, if AU 1 is being detected in the analysis, features associated with the brow may be included. The base set of facial features may be identified and/or obtained in any manner consistent with the present disclosure.

At block 315, an analysis image n may be obtained. For example, an image may be obtained to be analyzed using the base facial image from block 305 and/or the base set of facial features from block 310. The image n may include any image with a face, which may include the face oriented or facing in any direction, such as a different pose than that of the base image. In some embodiments, the image n may be used as part of a training dataset for training a machine learning system or other system used for performing image analysis.

At block 320, image normalization may be applied to the analysis image n based on the base facial features. For example, the image n may be normalized using a Procrustes analysis transformation or some other image modification technique, an example of which is described with reference to FIG. 5. In these and other embodiments, the image normalization may cause a rotation, resizing, transposing, stretching, skewing, etc. of the image. Proceeding from the block 320, the method 300 may proceed to the block 325 if training a model to facilitate detection of facial actions, and the method 300 may proceed to the block 330 if performing image analysis on an image.

At block 325, a model may be trained using the normalized analysis image n. For example, a machine learning system or other trainable analysis system may be used to analyze the image n (and/or other images) to identify the presence and/or absence of various AUs. In some embodiments, when training the model, the image n may include an indication of which AUs are present or absent in the image n such that the model may learn which orientations and/or locations of features are indicative of the presence of the AUs and/or the intensity of the AUs. Additionally or alternatively, the image n may not include any indication of which AUs are present in the image in the training data set. Based on the variation in the locations of the features across the training dataset, the relative differences may be projected as predictive of whether or not an AU is present. For example, if 80% of the images in a training data set include a feature associated with an AU within a threshold distance of each other, and the remaining 20% were spread out away from each other, the remaining 20% may be separated as corresponding to different intensity values for the given AU, with the 80% corresponding to a lack of the AU. Additionally or alternatively, by training the model across the dataset, the presence or absence of AUs may be determined based on different orientations, as the training dataset may have observed the presence/absence of AUs with different poses of the face (e.g., looking to the side, looking down and away, rather than only looking directly forward at the camera). After the block 325 training the model based on the image n, the method 300 may proceed to the block 335 such that additional images in the training dataset may be analyzed to contribute to the model.

At block 330, a prediction may be made for one or more AUs in the analysis image n based on the normalized image n and the location of the features therein. For example, the features in the normalized analysis image n may be compared to the model trained at the block 325 to predict the presence or absence of a given AU using the model. Additionally or alternatively, the normalized analysis image n may have image analysis performed regardless of the location of the features. The image analysis to predict the presence, absence, and/or intensity of the AUs may be any predictive/detecting approach. After the block 330 predicting the presence/absence/intensity of AUs for the analysis image n, the method 300 may proceed to the block 335.

At block 335, a determination may be made as to whether all analysis images are analyzed. For example, a determination may be made as to whether all images of the training dataset used in training the model have been considered. As another example, a determination may be made as to whether all images to be analyzed for presence/absence/intensity of AUs have been considered. If not all of the images have been analyzed, the method 300 may proceed to the block 340 where n is increased by one after which the method 300 returns to the block 315 to obtain the next analysis image for training and/or analysis. If all of the images have been analyzed, the method 300 may proceed to the block 345 where the method 300 may end.

Modifications, additions, or omissions may be made to the method 300 without departing from the scope of the disclosure. For example, the operations of the method 300 may be implemented in differing order. Additionally or alternatively, two or more operations may be performed at the same time. Furthermore, the outlined operations and actions are provided as examples, and some of the operations and actions may be optional, combined into fewer operations and actions, or expanded into additional operations and actions without detracting from the essence of the disclosed embodiments.

Figure 4A:
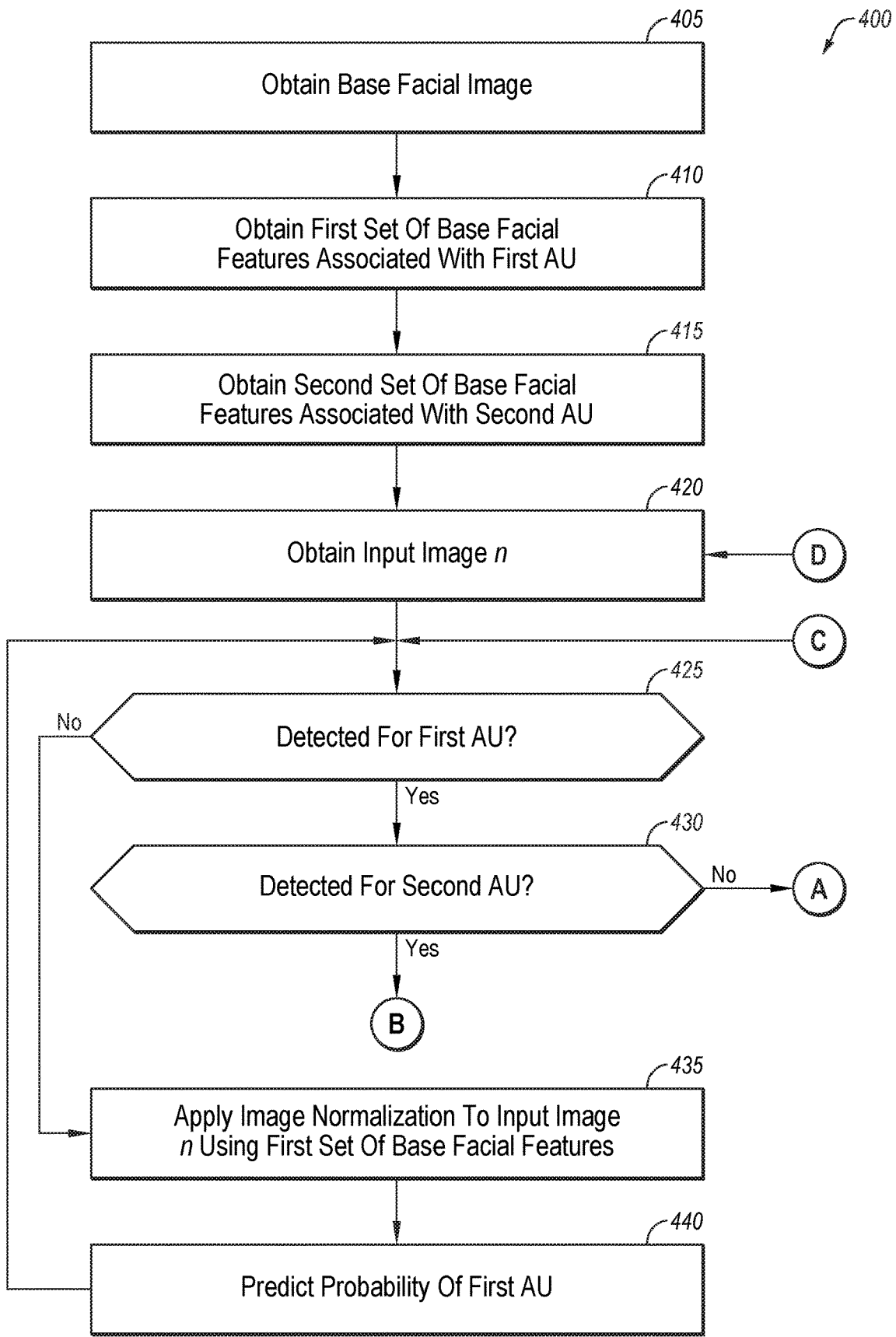
FIGS. 4A and 4B illustrate an example flowchart of an example method of image normalization and prediction of facial action units (AUs) in facial images.
Figure 4B:
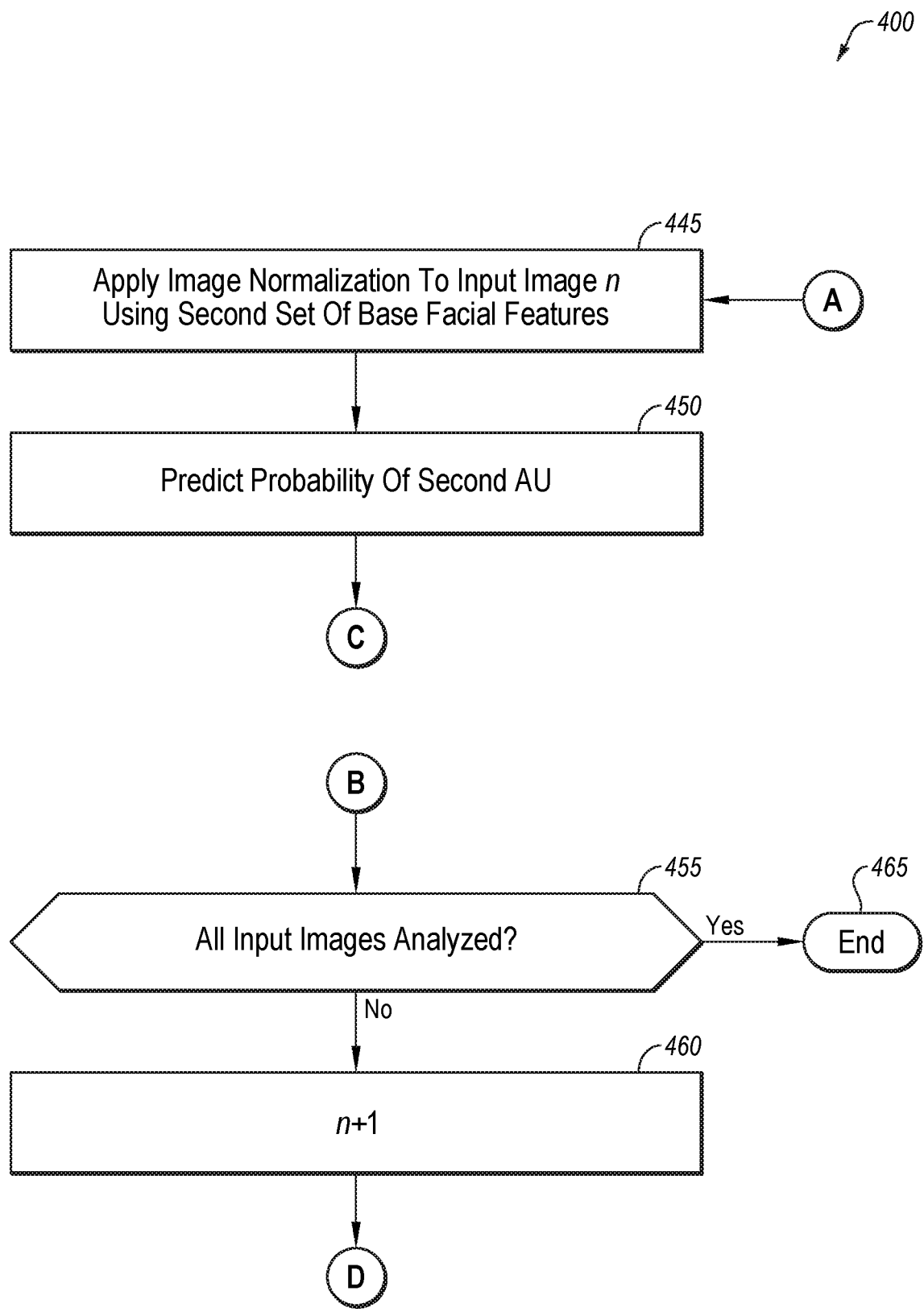

FIGS. 4A and 4B illustrate an example flowchart of an example method 400 of image normalization and prediction of action units (AUs) in facial images, in accordance with one or more embodiments of the present disclosure. One or more operations of the method 400 may be performed by a system or device, or combinations thereof, such as the computing device 600 of FIG. 6. The method 400 may be one example implementation of one or more of the flows of the present disclosure, such as the flow 100 and/or 200. Although illustrated as discrete blocks, various blocks of the method 400 may be divided into additional blocks, combined into fewer blocks, or eliminated, depending on the desired implementation.

At block 405, a base facial image may be obtained. The block 405 may be similar or comparable to the block 305 of FIG. 3.

At block 410, a first set of base facial features associated with a first AU may be obtained. The block 410 may be similar or comparable to the block 310 of FIG. 3. However, at the block 410, the first set of base facial features may be specific to an AU. For example, the first set of base facial features may include more features proximate the parts of the face that move in the AU.

At block 415, a second set of base facial features associated with a second AU may be obtained. The block 415 may be similar or comparable to the block 410, although the second set of base facial features may be associated with a different AU than the first set of base facial features. As such, the second set of base facial features may be different than the first set of base facial features.

At block 420, an analysis image n may be obtained. The analysis image n may be used for image analysis.

At block 425, a determination may be made whether the analysis image n has been analyzed to detect the presence/absence/intensity of the first AU. If such an analysis has not been performed, the method 400 may proceed to the block 435. If such an analysis has been performed, the method 400 may proceed to the block 430.

At block 430, a determination may be made whether the analysis image n has been analyzed to detect the presence/absence/intensity of the second AU. If such an analysis has not been performed, the method 400 may proceed to the block 445. If such an analysis has been performed, the method 400 may proceed to the block 455.

At block 435, image normalization may be applied to the analysis image n using the first set of base facial features. For example, the analysis image n may undergo a Procrustes analysis transformation where the points used in the transformation are the first set of base facial features. In these and other embodiments, the block 435 may be similar or comparable to the block 320 of FIG. 3, but based on the first set of base facial features.

At block 440, the probability of the first AU may be predicted using the normalized image from block 435. In these and other embodiments, an intensity of the first AU may be included in the prediction. The block 440 may be similar or comparable to the block 330 of FIG. 3, but may be specific to the first AU. After the block 440, the method 400 may return to the block 425.

At block 445, image normalization may be applied to the analysis image n using the second set of base facial features. The block 445 may be similar or comparable to the block 435 although based on the second set of base facial features. Because the block 445 is based off of a different set of base facial features, the normalized image generated in the block 445 may be different in orientation, rotation, scaling, etc. as compared to the normalized image generated in the block 435. Such differences may be accentuated in the regions of and/or proximate the muscle groups that are used in the first and/or the second AU.

At block 450, the probability of the second AU may be predicted using the normalized image from block 445. The block 450 may be similar or comparable to the block 440, but may be specific to the second AU rather than the first AU. After the block 450, the method 400 may return to the block 425.

At block 455, a determination may be made whether all analysis images have been analyzed. For example, a determination may be made whether all images to be analyzed have been analyzed through blocks 425-450 to predict the probabilities of the first and/or the second AU being present in the images. If all of the analysis images have not been analyzed, the method 400 may proceed to the block 460 where n is increased by one, and may return to the block 420 to obtain the next image for analysis. If all of the analysis images have been analyzed, the method 400 may proceed to the block 465 to end.

Modifications, additions, or omissions may be made to the method 400 without departing from the scope of the disclosure. For example, the operations of the method 400 may be implemented in differing order. Additionally or alternatively, two or more operations may be performed at the same time. Furthermore, the outlined operations and actions are provided as examples, and some of the operations and actions may be optional, combined into fewer operations and actions, or expanded into additional operations and actions without detracting from the essence of the disclosed embodiments. For example, the blocks 425-450 may be repeated/iterated for any number of AUs, such as for AUs 0-28, rather than just a first and a second AU.

FIG. 5 illustrates an example flowchart of an example method 500 of one technique of image normalization, in accordance with one or more embodiments of the present disclosure. One or more operations of the method 500 may be performed by a system or device, or combinations thereof, such as the computing device 600 of FIG. 6. The method 500 may be one example implementation of image normalization, such as the blocks 320 of FIG. 3, 435 of FIG. 4A, and/or 445 of FIG. 4B. Although illustrated as discrete blocks, various blocks of the method 500 may be divided into additional blocks, combined into fewer blocks, or eliminated, depending on the desired implementation.

At block 510, an analysis image may be scaled to be a same size as a base image. For example, the analysis image may maintain an aspect ratio and may be scaled to a same number of pixels horizontally and/or vertically as the base image. As another example, the analysis image may be scaled such that the maximum height and/or width of the face in the analysis image is the same as that in the base image. In some embodiments, the base set of features of the base image and the corresponding set of features in the analysis image may be used. For example, a general shape may be formed (e.g., oval or circular) or a maximum height or width of the features may be identified in the base image, and the analysis image may be scaled such that the features in the face of the analysis image form the same size general shape, or are at the same maximum height/maximum width, etc. In some embodiments, the base image may be sized to correspond to the size expected or used by the analysis engine, model, etc.

At block 520, the analysis image may be transposed to be at a same location as the base image based on the center of gravity of the base image and the center of gravity of the analysis image. For example, described mathematically, if the analysis image and the base image are in cartesian coordinates, the features may be at (x, y) points (e.g., $(x_1, y_1), (x_2, y_2), \ldots (x_n, y_n)$), and the average of the (x, y) points for the base image $$\left(\text{e.g.,}\ \left(\frac{(x_1 + x_2 + \ldots + x_n)}{n}, \frac{(y_1 + y_2 + \ldots + y_n)}{n}\right)\right)$$

may be treated as the origin (e.g., the center of gravity) and the average of the (x, y) points for the analysis image may also be treated as the origin (e.g., the center of gravity) by transposing the first image such that the two origins overlap.

At block 530, the analysis image may be rotated to be aligned with the base image. For example, the analysis image may be rotated about the origin (e.g., the center of gravity) to minimize the sum of squared distances between the base set of features in the base image and the corresponding features in the analysis image. As another example, the analysis image may be rotated to maximize overlap of the maximum number of corresponding features. As an additional example, the image may be rotated to have a selected key feature or subset of features for a particular AU overlap in both images or to minimize the sum of squared distances between the subset of features. As an example of such a feature, if AU 1 were being predicted, the rotation may align a key feature point near the brows on the forehead, or a set of feature points along the brow and up the forehead, etc.

Modifications, additions, or omissions may be made to the method 500 without departing from the scope of the disclosure. For example, the operations of the method 500 may be implemented in differing order (e.g., the analysis image may be scaled, transposed, or rotated, in any order). Additionally or alternatively, two or more operations may be performed at the same time. Furthermore, the outlined operations and actions are provided as examples, and some of the operations and actions may be optional, combined into fewer operations and actions, or expanded into additional operations and actions without detracting from the essence of the disclosed embodiments.

Figure 6:
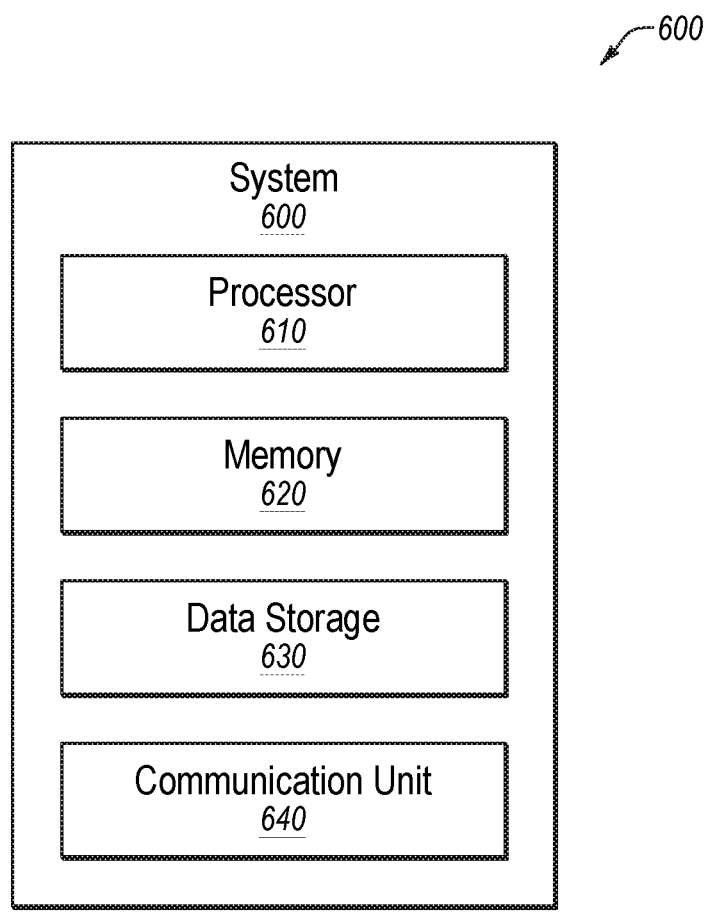
FIG. 6 illustrates an example computing system.

FIG. 6 illustrates an example computing system 600 to facilitate determining and/or visualizing bias in a data set, according to at least one embodiment described in the present disclosure. The computing system 600 may include a processor 610, a memory 620, a data storage 630, and/or a communication unit 640, which all may be communicatively coupled. Any or all of the flows 100 and/or 200 of FIGS. 1 and 2 may be implemented by a computing system consistent with the computing system 600. Additionally or alternatively, any of the operations of the methods 300, 400, and/or 500 of FIGS. 3-5 may be performed by a computing system consistent with the computing system 600. For example, the computing system 600 may obtain facial images, perform image normalization on the facial images, and predict the probability of AUs in the facial images.

Generally, the processor 610 may include any suitable special-purpose or general-purpose computer, computing entity, or processing device including various computer hardware or software modules and may be configured to execute instructions stored on any applicable computer-readable storage media. For example, the processor 610 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 6, it is understood that the processor 610 may include any number of processors distributed across any number of network or physical locations that are configured to perform individually or collectively any number of operations described in the present disclosure. In some embodiments, the processor 610 may interpret and/or execute program instructions and/or process data stored in the memory 620, the data storage 630, or the memory 620 and the data storage 630. In some embodiments, the processor 610 may fetch program instructions from the data storage 630 and load the program instructions into the memory 620.

After the program instructions are loaded into the memory 620, the processor 610 may execute the program instructions, such as instructions to perform any of the processes 300, 400, and/or 500 of FIGS. 3-5, respectively. For example, the processor 610 may obtain instructions regarding normalizing images for facial analysis.

The memory 620 and the data storage 630 may include computer-readable storage media or one or more computer-readable storage mediums for carrying or having computer-executable instructions or data structures stored thereon. Such computer-readable storage media may be any available media that may be accessed by a general-purpose or special-purpose computer, such as the processor 610. In some embodiments, the computing system 600 may or may not include either of the memory 620 and the data storage 630.

By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 610 to perform a certain operation or group of operations.

The communication unit 640 may include any component, device, system, or combination thereof that is configured to transmit or receive information over a network. In some embodiments, the communication unit 640 may communicate with other devices at other locations, the same location, or even other components within the same system. For example, the communication unit 640 may include a modem, a network card (wireless or wired), an optical communication device, an infrared communication device, a wireless communication device (such as an antenna), and/or chipset (such as a Bluetooth device, an 802.6 device (e.g., Metropolitan Area Network (MAN)), a WiFi device, a WiMax device, cellular communication facilities, or others), and/or the like. The communication unit 640 may permit data to be exchanged with a network and/or any other devices or systems described in the present disclosure. For example, the communication unit 640 may allow the system 600 to communicate with other systems, such as computing devices and/or other networks.

One skilled in the art, after reviewing this disclosure, may recognize that modifications, additions, or omissions may be made to the system 600 without departing from the scope of the present disclosure. For example, the system 600 may include more or fewer components than those explicitly illustrated and described.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, it may be recognized that changes may be made in form and detail without departing from the scope of the present disclosure. Thus, the present disclosure is limited only by the claims.

In some embodiments, the different components, modules, engines, and services described herein may be implemented as objects or processes that execute on a computing system (e.g., as separate threads). While some of the systems and processes described herein are generally described as being implemented in software (stored on and/or executed by general purpose hardware), specific hardware implementations or a combination of software and specific hardware implementations are also possible and contemplated.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

Additionally, the use of the terms "first," "second," "third," etc. are not necessarily used herein to connote a specific order. Generally, the terms "first," "second," "third," etc., are used to distinguish between different elements. Absence a showing of a specific that the terms "first," "second," "third," etc. connote a specific order, these terms should not be understood to connote a specific order.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that various changes, substitutions, and alterations could be made hereto without departing from the spirit and scope of the present disclosure.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A method comprising:
   obtaining a base facial image;
   obtaining a first set of base facial features within the base facial image, the first set of base facial features selected as associated with a first facial action unit (AU) to be detected in an analysis facial image and associated with a first sub-region of a face;
   obtaining a second set of base facial features within the base facial image, at least one facial feature in the second set of base facial features being different from those in the first set of base facial features, the second set of base facial features selected as associated with a second facial AU to be detected in the analysis facial image, the second set of base facial features including at least one mouth area feature, the second set of base facial features associated with a second sub-region of the face different from the first sub-region;
   obtaining the analysis facial image;
   applying a first image normalization to the analysis facial image using the first set of base facial features to facilitate prediction of a probability of the first facial AU in the analysis facial image; and
   applying a second image normalization to the analysis facial image using the second set of base facial features to facilitate prediction of a probability of the second facial AU in the analysis facial image.

2. The method of claim 1, wherein applying the first image normalization includes applying a Procrustes analysis transformation using the first set of base facial features.

3. The method of claim 1, wherein the first set of base facial features are selected to be positioned at regions of a face that move during the first facial AU.

4. The method of claim 3, wherein a density of the first set of base facial features are selected to be more dense at the regions of the face that move during the first facial AU than regions of the face that do not move during the first facial AU.

5. The method of claim 1, wherein the first set of base facial features are weighted such that facial features that move during the first facial AU are more heavily weighted than facial features that do not move during the first facial AU.

6. The method of claim 5, wherein the weights of the first set of base facial features are determined based on at least one of an occlusion sensitivity map or a set of muscle groups used in movement associated with the first facial AU.

7. The method of claim 1, further comprising training a facial analysis engine by performing operations on a plurality of training facial images, the operations including:
applying the first image normalization to a first training facial image using the first set of base facial features to train the facial analysis engine to identify the first facial AU in the first training facial image; and
applying the second image normalization to a second training facial image using the second set of base facial features to train the facial analysis engine to identify the second facial AU in the second training facial image.

8. The method of claim 1, wherein the first image normalization and the second image normalization are the same except for using the first set of base facial features and the second set of base facial features in the first image normalization and the second image normalization, respectively.

9. The method of claim 1, further comprising estimating an intensity of at least one of the first facial AU and the second facial AU in the analysis image.

10. The method of claim 1, wherein the base facial image includes a forward-facing neutral-expression facial image.

11. A non-transitory computer-readable medium containing instructions that, when executed by one or more processors, are configured to perform operations, the operations comprising:
obtain a base facial image with a frontal face;
obtain a first set of base facial features within the base facial image, the first set of base facial features selected as associated with a first facial action unit (AU) to be detected in an analysis facial image and associated with a first sub-region of a face;
obtain a second set of base facial features within the base facial image, at least one facial feature in the second set of base facial features being different from those in the first set of base facial features, the second set of base facial features selected as associated with a second facial AU to be detected in the analysis facial image, the second set of base facial features including at least one mouth area feature, the second set of base facial features associated with a second sub-region of the face different from the first sub-region;
obtain the analysis facial image;
apply a first image normalization to the analysis facial image using the first set of base facial features to facilitate prediction of a probability of the first facial AU in the analysis facial image; and
apply a second image normalization to the analysis facial image using the second set of base facial features to facilitate prediction of a probability of the second facial AU in the analysis facial image.

12. The computer-readable medium of claim 11, wherein applying the first image normalization includes applying a Procrustes analysis transformation using the first set of base facial features.

13. The computer-readable medium of claim 11, wherein the first set of base facial features are selected to be positioned at regions of a face that move during the first facial AU.

14. The computer-readable medium of claim 13, wherein a density of the first set of base facial features are selected to be more dense at the regions of the face that move during the first facial AU than regions of the face that do not move during the first facial AU.

15. The computer-readable medium of claim 11, wherein the first set of base facial features are weighted such that facial features that move during the first facial AU are more heavily weighted than facial features that do not move during the first facial AU.

16. The computer-readable medium of claim 15, wherein the weights of the first set of base facial features are determined based on at least one of an occlusion sensitivity map or a set of muscle groups used in movement associated with the first facial AU.

17. The computer-readable medium of claim 11, the operations further comprising train a facial analysis engine by performing operations on a plurality of training facial images, the operations including:
apply the first image normalization to a first training facial image using the first set of base facial features to train the facial analysis engine to identify the first facial AU in the first training facial image; and
apply the second image normalization to a second training facial image using the second set of base facial features to train the facial analysis engine to identify the second facial AU in the second training facial image.

18. The computer-readable medium of claim 11, wherein the first image normalization and the second image normalization are the same except for using the first set of base facial features and the second set of base facial features in the first image normalization and the second image normalization, respectively.

19. The computer-readable medium of claim 11, the operations further comprising estimate an intensity of at least one of the first facial AU and the second facial AU in the analysis image.

20. A system comprising:
one or more processors;
one or more non-transitory computer-readable media containing instructions, which when executed by the one or more processors, cause the system to perform operations comprising:
obtain a base facial image with a frontal face;
obtain a first set of base facial features within the base facial image, the first set of base facial features selected as associated with a first facial action unit (AU) to be detected in an analysis facial image and associated with a first sub-region of a face;
obtain a second set of base facial features within the base facial image, at least one facial feature in the second set of base facial features being different from those in the first set of base facial features, the second set of base facial features selected as associated with a second facial AU to be detected in the analysis facial image, the second set of base facial features including at least one mouth area feature, the second set of base facial features associated with a second sub-region of the face different from the first sub-region;
obtain the analysis facial image;
apply a first image normalization to the analysis facial image using the first set of base facial features to facilitate prediction of a probability of the first facial AU in the analysis facial image; and
apply a second image normalization to the analysis facial image using the second set of base facial features to facilitate prediction of a probability of the second facial AU in the analysis facial image.

\* \* \* \* \*